United States Patent
Low et al.

(10) Patent No.: US 9,336,949 B2
(45) Date of Patent: May 10, 2016

(54) LOW INDUCTANCE INTEGRAL CAPACITOR ASSEMBLY

(75) Inventors: Kum Sang Low, Selangor Darul Ehsan (MY); Albert Kok Foo Ng, Selangor Darul Ehsan (MY); Chee Hoong Low, Selangor Darul Ehsan (MY); Kum Wan Low, Selangor Darul Ehsan (MY); David Mahadevan, Selangor Darul Ehsan (MY); Chin Yang Chia, Kuala Lumpur (MY); Kean Phoe Cheong, Kuala Lumpur (MY)

(73) Assignee: SPECSCAN SDN BHD, Puchong, Selangor Darul Ehsan (MY)

( * ) Notice: Subject to any disclaimer, the term of this patent is extended or adjusted under 35 U.S.C. 154(b) by 560 days.

(21) Appl. No.: 13/519,390

(22) PCT Filed: Dec. 30, 2010

(86) PCT No.: PCT/MY2010/000334
§ 371 (c)(1),
(2), (4) Date: Nov. 5, 2012

(87) PCT Pub. No.: WO2011/081516
PCT Pub. Date: Jul. 7, 2011

(65) Prior Publication Data
US 2013/0063859 A1 Mar. 14, 2013

(30) Foreign Application Priority Data
Dec. 31, 2009 (MY) .............................. PI20095694

(51) Int. Cl.
*H01G 4/26* (2006.01)
*H01G 4/232* (2006.01)
(Continued)

(52) U.S. Cl.
CPC ................. *H01G 4/26* (2013.01); *H01G 4/232* (2013.01); *H01G 4/30* (2013.01); *H01G 4/38* (2013.01)

(58) Field of Classification Search
CPC ........... H01G 4/232; H01G 4/26; H01G 4/30; H01G 4/38; H01G 4/32

USPC ........... 361/328, 323, 306.1, 301.5, 329, 330, 361/273, 306.2, 509, 314, 520, 627, 517, 361/272
See application file for complete search history.

(56) References Cited

U.S. PATENT DOCUMENTS 1,480,604 A * 1/1924 Dubilier ..................... 361/308.1
1,850,105 A   3/1932 Higginbottom
(Continued)

FOREIGN PATENT DOCUMENTS

CA    1287890    8/1991
GB    372695     5/1932

OTHER PUBLICATIONS

Shipman, J.D. (1967). Travelling wave excitation of high power gas lasers. Applied Physics Letters, vol. 10(1), pp. 3-4.
(Continued)

*Primary Examiner* — David M Sinclair
(74) *Attorney, Agent, or Firm* — Renner Kenner Greive Bobak Taylor & Weber

(57) ABSTRACT

The invention provides an integral high-voltage capacitor assembly that yields very low self inductance and provides voltage and current multiplication. The capacitor assembly has two or four capacitors connected in series, with each capacitor made up of a stack of capacitor cells (40) also connected in series. Each of the capacitor cells (40) includes an arrangement of a pair of elongate foil electrodes (10) separated by dielectric (20, 30), and multiply-folded in a substantially flat, wound configuration. In the case of the two-capacitor assembly, in one embodiment the adjacent capacitor cells of the first capacitor (11) are connected in series by joining their foil electrodes on only one longitudinal side of the foil electrodes, while the adjacent capacitor cells of the second capacitor (12) are connected in series by joining their foil electrodes on both longitudinal sides of the foil electrodes. By connecting two units of the two-capacitor assemblies in different ways, various four-capacitor assemblies (80; 90) can be configured to provide enhanced voltage and current multiplication.

21 Claims, 8 Drawing Sheets

(51) Int. Cl.
*H01G 4/38* (2006.01)
*H01G 4/30* (2006.01)

(56) References Cited

U.S. PATENT DOCUMENTS

| | | | | |
|---|---|---|---|---|
| 2,531,185 | A | * | 11/1950 | Wurster ............... 361/329 |
| 2,878,433 | A | * | 3/1959 | Beresford ............. 361/329 |
| 2,933,664 | A | | 4/1960 | Linderholm |
| 3,209,217 | A | * | 9/1965 | Innis et al. ........... 361/329 |
| 3,377,530 | A | * | 4/1968 | Meyers ............... 361/299.5 |
| 3,508,128 | A | * | 4/1970 | Allison .............. 361/330 |
| 3,689,811 | A | * | 9/1972 | Hoffman ............. 361/314 |
| 3,711,746 | A | * | 1/1973 | King ................. 361/329 |
| 3,946,290 | A | | 3/1976 | Yoshioka et al. |
| 4,077,020 | A | | 2/1978 | Anderson et al. |
| 4,198,671 | A | * | 4/1980 | Donigan et al. ........ 361/306.1 |
| 4,228,481 | A | * | 10/1980 | DiNicola et al. ....... 361/314 |
| 4,307,434 | A | * | 12/1981 | Holtzman ............ 361/328 |
| 4,344,105 | A | * | 8/1982 | Holtzman et al. ...... 361/314 |
| 4,580,191 | A | | 4/1986 | Cancell et al. |
| 4,939,620 | A | | 7/1990 | Arakawa et al. |
| 5,724,222 | A | | 3/1998 | Hirano et al. |
| 6,094,337 | A | | 7/2000 | Ueda et al. |
| 6,404,618 | B1 | * | 6/2002 | Beard et al. .......... 361/509 |
| 6,917,512 | B2 | | 7/2005 | Hongu et al. |
| 6,930,874 | B2 | * | 8/2005 | Lobo et al. .......... 361/272 |
| 7,492,574 | B2 | * | 2/2009 | Fresard et al. ........ 361/517 |
| 7,547,233 | B2 | * | 6/2009 | Inoue et al. .......... 439/627 |
| 2007/0236860 | A1 | * | 10/2007 | Stockman ........... 361/301.5 |
| 2008/0158780 | A1 | * | 7/2008 | Stockman ........... 361/520 |

OTHER PUBLICATIONS

Bushnell, A.H., et al., (2004). Design optimization of linear transformer driver (LTD) stage cell capacitors. General Atomics Energy Products Engineering Bulletin.

Houtman, H. et al., (1993). High-speed circuits for TE discharge lasers and high voltage applications. Review of Scientific Instruments, vol. 64(4), pp. 839-853.

Fletcher, J.H., et al., (1994). Design and performance of a simple 2 joule KrF laser. Measurement Science and Technology, vol. 5(3), pp. 255-259.

Polypropylene Capacitor Film. (2005). Shin-Etsu Film Co., Ltd.

* cited by examiner

LOW INDUCTANCE INTEGRAL CAPACITOR ASSEMBLY

FIELD OF THE INVENTION

This invention relates generally to capacitors. More particularly the invention relates to an integral high-voltage capacitor assembly.

BACKGROUND ART

Capacitors are used in circuit configurations in pulse power applications, such as for the operation of gas discharge lasers that require faster and higher voltage and higher current pulses. For these applications, in order to obtain some form of voltage multiplication and low inductance high current discharge operation, the LC inversion and the capacitor transfer circuit configurations are commonly chosen as known by those skilled in the art. A brief description of these circuit configurations is given herewith, as well as shown in FIGS. 1 and 2, respectively.

In the LC inversion discharge circuit (FIG. 1), two equal capacitors 1, 2 are charged up in parallel. Upon triggering the switching gap to discharge one of the capacitors, there will be a voltage oscillation leading to a voltage inversion. With a small voltage damping across a switching device such as a spark gap or a rail gap switch 4, the voltage across the two capacitors can experience a near voltage doubling, which is applied across a laser channel 3, resulting in the electrical breakdown of the gas medium. Here it is assumed that the charging element 5 is a resistor of sufficient high resistance or an inductor of appropriate inductance.

In the capacitor transfer circuit (FIG. 2), two unequal capacitors are used. The larger storage capacitor 6 is initially charged to its full voltage and then triggered to discharge across a spark gap switch 9. Part of the stored charges is transferred to the normally 3 to 4 times smaller peaking capacitor 7 leading to a near doubling of the voltage for the discharge across the gas laser channel 8. In order to obtain low circuit inductance operation, the smaller peaking capacitor is placed as close to the discharge channel as possible leading to a fast discharge across the channel. Like in the case of the LC inversion discharge circuit, the charging element 5 is again either a resistor or an inductor.

The three types of capacitors commonly used in circuit configurations in pulse power applications are flat parallel plate capacitors, oil impregnated folded Mylar®/paper foil capacitors and ceramic doorknob capacitors.

The flat parallel plate capacitors operate in atmospheric conditions without immersion in oil normally and use relatively thick Mylar® foils as insulating layers. Used mainly in lasers requiring low operating voltages of 10 to 20 kV and relatively small capacitances of 10 to 25 nF, the two capacitors 15 are constituted of three aluminum plates sandwiching a few layers of Mylar® sheets of appropriate thickness and stacked up on top of one another (see FIG. 3).

The laser channel 14 is connected directly on the edges of the top and bottom electrode plates 15a and 15c of the capacitor, forming low circuit inductance while the spark gap 16 is connected at the opposite end of the plates 15b and 15c. Depending on the magnitude of the two capacitors and their connections to the laser channel and the spark gap, two circuit configurations of the transmission line type LC inversion circuit (commonly known as a Blumlein circuit) or the capacitor transfer circuit configuration can be readily obtained.

Due to the compact circuit discharge loops of such flat plate capacitor discharge, relatively low circuit inductance is achieved. However, the major setbacks are the relatively low operating voltage and small capacitance of the flat plate capacitors. This has limited the maximum discharge current to tens of kiloamperes for a 0.5 m long laser discharge channel, irrespective of whether it is connected using the LC inversion or the capacitor transfer circuit.

On the other hand, the oil impregnated folded Mylar®/paper foil capacitors are available in a large range of capacitances ranging from 15 to 200 nF and rated between 20 to 100 kV.

U.S. Pat. No. 3,711,746 describes the basic methods of folding these capacitors, in particular in FIG. 2 of the US patent. Two aluminum foil electrodes and two sets of dielectric materials are laid alternately one on top of another in the sequence of aluminum, dielectric materials, aluminum and dielectric materials. These are then folded flat to be rectangular or square in dimension for a number of times to constitute a capacitor section. The dielectric materials typically consist of one or two sheets of Mylar® sandwiched by two or three layers of kraft paper. Pairs of aluminum foil tabs are inserted along the sides of the folded capacitors to make electrical contacts with the electrodes. Multiple units of these capacitor sections are then stacked and connected in series by appropriate crimping of the adjoining tabs of the stacked sections to enable higher voltage operation. The finished unit is then thoroughly baked and dried in vacuum before being impregnated in castor oil and appropriately encased.

These capacitors are available commercially in different dimensions in accordance with the capacitance and voltage range. The nominal self inductance of these stand alone capacitor units is typically quoted by the manufacturers to be in the range from 15 to 25 nH for an approximately 12 cm square, 3 cm thick folded foil capacitor unit. Due to this relatively large capacitor self inductance and the corresponding large discharge loop inductance, such commercially available folded foil capacitors are not suitable for use in high peak discharge current LC inversion circuits or as peaking capacitors in capacitor transfer circuits. These stand alone units of folded foil capacitors are normally used as storage capacitors in capacitor transfer circuits.

Ceramic doorknob capacitors (FIG. 4) are fabricated in different sizes ranging in values from 0.1 to 10 nF and rated at 15 to 40 kV. The larger units are often used as storage capacitors with a number of these units connected in parallel. The smaller units are used as peaking capacitors and are normally connected in two arrays along the two sides of the discharge electrodes. Examples of ceramic doorknob capacitors are disclosed on the U.S. Pat. Nos. 4,939,620 and 3,946,290.

Canadian Patent No. 1,287,890 describes the assembly of the 2-stage LC inversion circuit by using a +V and a −V charging across the spark gap resulting in a near fourfold increase in the output voltage with respect to the input voltage.

Four doorknob types ceramic capacitors are used in these 2-stage LC inversion circuits. By arranging two rows of doorknob capacitors symmetrically on the two sides of the electrodes, the current can be doubled, thus the name double sided 2-stage LC inversion circuit. Nevertheless, due to the physical size of the ceramic capacitors, relatively low discharge current of the order of a few tens of kiloamperes for a 35 cm long discharge channel is obtained.

Many attempts have thus been made in the past to scale the discharge voltage as well as to increase the discharge current with various circuit configurations. However, with the presently available choice of capacitors and choice of circuit configurations, the designs of transverse discharge lasers have led to circuits with relatively high inductance and/or relatively low operating voltage. These designs only manage to generate relatively low peak current densities of between 0.5 up to a maximum of 2 to 3 kiloamperes per unit centimeter length or so in a few tens of nanoseconds current pulse.

SUMMARY OF THE INVENTION

The present invention and disclosure demonstrate how folded foil capacitors can be assembled to yield very low self inductance. It is then shown how multiple units of these folded foil capacitors can be assembled and integrated to constitute various low inductance current and voltage multiplying discharge schemes for use in transverse discharge laser applications as well as in other pulse power applications.

It is thus one aim of the present invention to provide an improved integrated capacitor assembly that is suitable especially, though not exclusively, for use in gas discharge laser applications.

In one aspect, the invention provides a high-voltage capacitor assembly, comprising:
a first capacitor; and
a second capacitor;
each capacitor comprising a stack of capacitor cells connected in series;
each of the capacitor cells comprising an arrangement of a pair of elongate foil electrodes separated by dielectric and multiply-folded in a substantially flat, wound configuration;
wherein adjacent cells of the stack comprising the first capacitor are connected in series by joining their foil electrodes on one longitudinal side of the foil electrodes;
wherein adjacent cells of the stack comprising the second capacitor are connected in series by joining their foil electrodes on both longitudinal sides of the foil electrodes; and
wherein the first and second capacitors are connected in series and integrated into an enclosure.

Such an arrangement permits the capacitor assembly to be connected in either an LC inversion or a capacitor transfer circuit configuration.

In one embodiment, the foil electrodes of adjacent cells are joined at a single instance on the or each longitudinal side of the foil electrodes.

In another embodiment, the foil electrodes of adjacent cells are connected together substantially at their longitudinal centers. When the foil electrode has an odd number of folded sections, there will exist a section at the longitudinal center of the electrode, at which the necessary connection may be made. In the case of an even number of folded sections, on the other hand, there will exist two central sections and the necessary connection may be made to either of these. The phrase "substantially at their longitudinal centers" shall be construed as including these possibilities.

In a further embodiment, the foil electrodes of adjacent cells are connected together by a bridging element that contacts each foil electrode over substantially the length of one folded section.

The bridging element may be a sheet-like element that is folded to define a pair of legs for connection to the respective foil electrodes of the adjacent cells. The bridging element helps yield very low self inductance.

In one embodiment, the first and second capacitors are interconnected on said one longitudinal side, that is on the side where the cells of the first capacitor are interconnected in series. This provides for efficient and fast current discharge.

In another embodiment, each folded section of the foil electrode is rectangular in shape.

In a further embodiment, each folded section of the foil electrode is square in shape.

In one embodiment, each pair of elongate electrodes has a foil width of 0.1 to 1 meter and foil length of between 1 to 20 meters to result in sufficiently high capacitance and yet yield acceptable transit time delay broadening of the discharge current pulse. The optimum number of folded sections will then depend on the requirements of the particular application, and be subject to such parameters as the relative length and width of the foil electrode, and the desired length of the folded sections.

In another embodiment, the first and second capacitors and cells within each capacitor are disposed adjacent one another, with the folded sections of their foil electrodes mutually parallel. For example, the first and second capacitors may be stacked vertically, i.e. one laid on top of the other. Such an arrangement facilitates the interconnection of the capacitors in a manner analogous to the interconnection of adjacent cells in each capacitor.

In a further embodiment, the assembly includes external electrodes that are connected internally to the first and second capacitors and have a length substantially corresponding to the length of the folded sections of the foil electrodes. The length of the external electrodes suitably corresponds substantially to the length of equipment to be connected, such as a laser discharge channel.

In yet a further embodiment, the external electrodes comprise a first pair of external electrodes connected on the side where the first and second capacitors are interconnected in series, and a second pair of external electrodes connected only across the second capacitor on the opposite longitudinal side. The vertical height gap of one or both pairs of electrodes may correspond substantially to the height of equipment to be connected, such as a laser discharge channel.

In another aspect, the invention provides an integral high-voltage capacitor assembly comprising:
a first capacitor;
a second capacitor;
a third capacitor; and
a fourth capacitor;
each capacitor comprising a stack of capacitor cells connected in series;
each of the capacitor cells comprising an arrangement of a pair of elongate foil electrodes separated by dielectric and multiply-folded in a substantially flat, wound configuration;
wherein adjacent cells of the stacks comprising the first and fourth capacitors are connected in series by joining their foil electrodes on one longitudinal side of the foil electrodes;
wherein adjacent cells of the stacks comprising the second and third capacitors are connected in series by joining their foil electrodes on both longitudinal sides of the foil electrodes; and
wherein the first, second, third and fourth capacitors are connected in series and integrated into an enclosure.

Such an arrangement permits the capacitor assembly to be connected in any of a 2-stage LC inversion, a 2-stage capacitor transfer circuit, a double LC inversion, or a double capacitor transfer circuit configuration, according to the sequence in which the four capacitors are connected in series. In case of a 2-stage LC or 2-stage capacitor transfer circuit, the capacitor may be arranged in the sequence of first, second, third and fourth capacitors; whereas in the case of a double LC or double capacitor transfer circuit, the capacitors may be arranged in the sequence of second, first, fourth and third capacitors.

In one embodiment, the foil electrodes of adjacent cells are joined at a single instance on the or each longitudinal side of the foil electrodes.

In another embodiment, the foil electrodes of adjacent cells are connected together substantially at their longitudinal centers. When the foil electrode has an odd number of folded sections, there will exist a section at the longitudinal center of the electrode, at which the necessary connection may be made. In the case of an even number of folded sections, on the other hand, there will exist two central sections and the necessary connection may be made to either of these. The phrase "substantially at their longitudinal centers" shall be construed as including these possibilities.

In a further embodiment, the foil electrodes of adjacent cells are connected together by a bridging element that contacts each foil electrode over substantially the length of one folded section.

The bridging element may be a sheet-like element that is folded to define a pair of legs for connection to the respective foil electrodes of the adjacent cells. The bridging element helps yield very low self inductance.

In one embodiment, the first, second, third and fourth capacitors are interconnected on said one longitudinal side, that is the side where the cells of the first and fourth capacitor are connected in series. This provides for efficient and fast current discharge.

In another embodiment, each folded section of the foil electrode is rectangular in shape.

In a further embodiment, each folded section of the foil electrode is square in shape.

In one embodiment, each pair of elongate electrodes has a foil width of 0.1 to 1 meters and foil length of between 1 to 20 meters to result in sufficiently high capacitance and yet yield acceptable transit time delay broadening of the discharge current. The optimum number of folded sections will depend on the requirements of the particular application, and subject to such parameters as the relative length and width of the foil electrode, and the desired length of the folded sections.

In another embodiment, the first, second, third and fourth capacitors and cells within each capacitor are disposed adjacent one another, with the folded sections of their foil electrodes mutually parallel. For example, the first, second, third and fourth capacitors may be stacked vertically, i.e. the first laid on top of the second, the second laid on top of the third and the third laid on top of the fourth capacitor. Such an arrangement facilitates the interconnection of the capacitors in a manner analogous to the interconnection of adjacent cells in each capacitor.

In a further embodiment, the assembly includes external electrodes that are connected internally to the first, second, third and fourth capacitors.

In yet a further embodiment of a double LC or capacitor transfer configuration, on one side of the assembly where all the capacitors are interconnected in series, the external electrodes comprise a first external electrode connected to the second capacitor, a second external electrode connected to the first and fourth capacitors and a third external electrode connected to the third capacitor.

On the other side of the assembly, the external electrodes comprise another first external electrode connected to the second capacitor, another second external electrode connected to the second and third capacitors and another third external electrode connected to the third capacitor.

The three external electrodes may be mounted on a respective side of the assembly. The vertical height gap of the external electrodes may correspond substantially to the height of equipment to be connected, such as a laser discharge channel.

In yet a further embodiment of a 2-stage LC or capacitor transfer configuration, on one side of the assembly where all the capacitors are interconnected in series, the external electrodes comprise a first pair of external electrodes connected across the first and fourth capacitors.

On the other side of the assembly, the external electrodes comprise a second pair of external electrodes connected across the second and third capacitors.

Each pair of external electrodes may be mounted on a respective side of the assembly. The vertical height gap of one or both pairs of electrodes may correspond substantially to the height of equipment to be connected, such as a laser discharge channel.

Embodiments of this invention provide an integral high-voltage capacitor assembly comprising two or four folded foil capacitors with low internal circuit inductance connected in a novel manner. This is achieved by a number of steps, including:

stacking on top of one another, cells of flat-wound elongate foil electrodes that are separated by dielectric films to form a capacitor unit, that is further stacked to form a two or four capacitor assembly, ensuring each cell will provide of only two specific contact areas that will serve as the location for the connection to the next adjacent cells or an external connection electrode, joining adjacent cells of certain capacitor units of the two or four capacitor assembly on one or both longitudinal sides using substantial sheet-like bridging elements that are partially insulated and inserted into the chosen contact areas of the cells, similarly connecting the capacitor units together in a series circuit using the same insulated bridging elements on specific longitudinal sides to provide fast current discharge or switching, providing four or six terminals from the capacitor assembly to external connection electrodes, bending the terminals in a manner to provide the lowest inductance possible.

This arrangement then permits the assembly to be connected via external electrodes to a switching device and a discharge device. If two capacitors are used, an LC inversion or capacitor transfer circuit configuration is provided for voltage and current multiplication on the discharge device. If four capacitors are used, a 2-stage LC inversion or capacitor transfer circuit configuration is provided for enhanced voltage and current multiplication on the discharge device. Similarly, with the appropriate connections made, a four-capacitor assembly may also provide a double LC inversion or capacitor transfer circuit configuration.

BRIEF DESCRIPTION OF THE DRAWINGS

These and other features of as well as advantages which characterize the present invention will be apparent upon reading of the following detailed description and review of the associated drawings, which illustrate although do not limit the invention, and in which.

DETAILED DESCRIPTION

Figure 9:
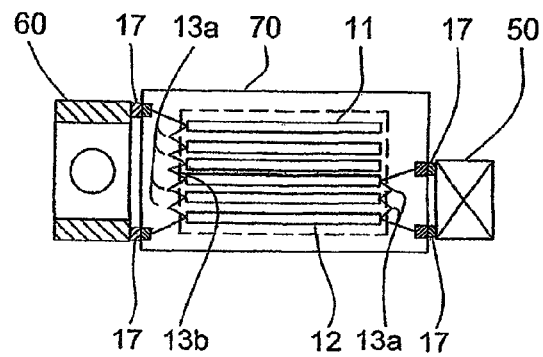
FIG. 9 is a cross sectional layout of a capacitor assembly according to an embodiment of the present invention, additionally showing external electrodes and components connected to the capacitor assembly.

Generally, the present invention is directed to an integral high-voltage capacitor assembly that yields very low self inductance and provides current and/or voltage multiplication. The basic unit of the high-voltage capacitor assembly according to one embodiment of the present invention is constructed from a first capacitor 11 and a second capacitor 12, which are connected in series, as shown in FIG. 9.

Figures 1, 2:
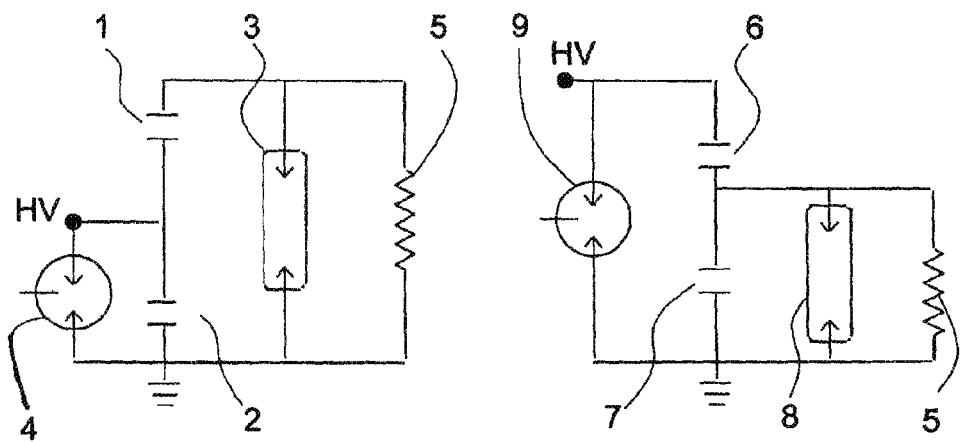
FIG. 1 is a circuit configuration of a conventional LC inversion discharge circuit.
FIG. 2 is a circuit configuration of a conventional capacitor transfer circuit.
Figure 3:
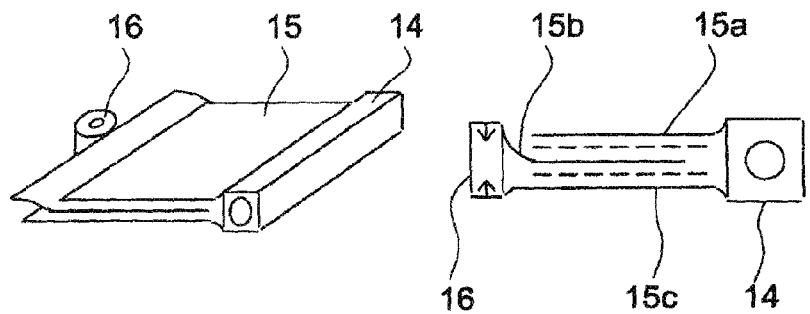
FIG. 3 is a diagrammatic illustration of conventional flat parallel plate capacitors, showing the conventional way of how laser channel is connected directly on the edges of two of the capacitor plates.
Figure 4:
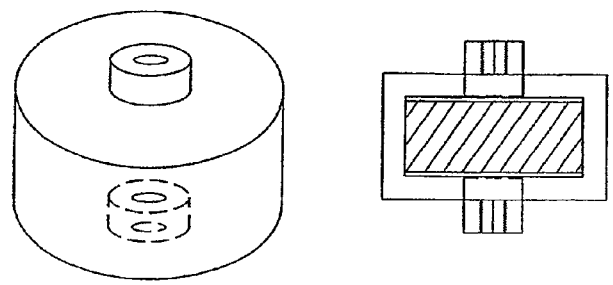
FIG. 4 is a diagrammatic illustration of a doorknob capacitor.
Figure 5:
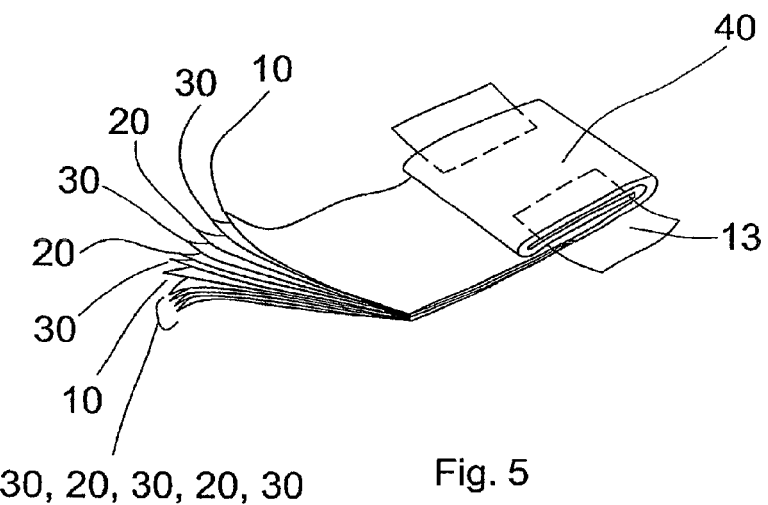
FIG. 5 is a diagrammatic illustration of a partially wound capacitor cell comprising electrodes and dielectric assembly according to an embodiment of the present invention.

Each capacitor comprises of a stack of capacitor cells 40 connected in series. Each of the capacitor cells 40 comprises of an arrangement of a pair of elongate foil electrodes separated by dielectric. In a preferred embodiment of the present invention, as shown in FIG. 5, aluminum foils 10 are used as foil electrodes. Typical thickness of the aluminum foils is 5 to 12 μm. The dielectric layers separating the foil electrodes comprise an absorbent material such as oil impregnated kraft paper sheets and an impermeable plastic such as polyethylene terephthalate (commonly known as Mylar®). Preferably, the intermediate dielectric layers are composite structures comprising alternating layers of two layers of Mylar® sheets 20, sandwiched by three layers of kraft paper sheets 30. Typical thickness of each Mylar® sheet is 12 μm thick and 8.3 μm for each kraft paper. Polypropylene (PP) films with hazy surfaces or other dielectric films may also be used to replace Mylar® and paper as dielectric layers.

The capacitors are then baked dry before being impregnated with castor oil or other suitable dielectric oil or fluid, and sealed. Preferably, the assembly is encapsulated in a hard casing body such as polyurethane.

In the conventional folded foil capacitors, it appears that quite often, more than one pair of side electrode tabs is used. This measure is adopted in order to reduce the transit time of the electromagnetic waves traveling from one end of the aluminum foil to enter or exit the capacitor at the electrode tabs. By inserting n pairs of electrode tabs along the sides of the folded capacitor section, current flow along the capacitor is divided into 2n segments. The path length of the current flow longitudinal to the folding is thus reduced by a factor of 2n.

However, this process of insertion of multiple sets of tabs also affects drastically the overall inductance of the capacitor. While it may be possible to compute the flow pattern of the charges entering/exiting the capacitor and hence to derive the effective self induced magnetic flux and hence the self inductance, it may be sufficient to estimate the self inductance using the following procedures.

Figure 10:
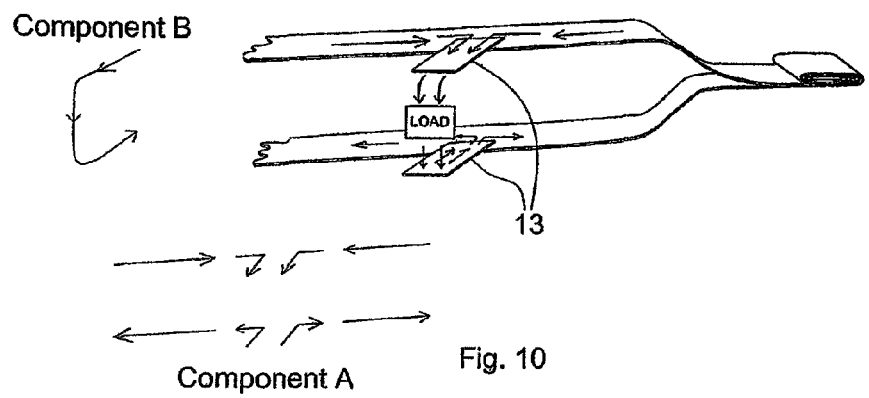
FIG. 10 is a diagram useful for understanding the components of the self inductance of a folded foil electrode capacitor.

The self inductance can be approximately divided into two components, one component results from the movement of charges along or opposite to the folding direction of the foil and another for charges entering or exiting the capacitor along the side inserted foil tabs 13 as shown in FIG. 10 for the case of a single pair of side inserted foil tabs.

In general, for the movement of charges along or opposite to the folding direction as indicated by component A of FIG. 10, all electrode foils except for the two innermost and two outermost carry two layers of charges, one on the front surface and another on the back surface due to the folding of the capacitor foils. Furthermore, two current paths are formed for each pair of inserted tabs. For a capacitor cell with n pairs of inserted electrode tabs, there is thus a total of 2*(2n) current paths with each path length reduced by a factor of 2n. The overall inductance is thus reduced by a factor of 2*(2n) when compared to the case of an equally long capacitor foil which is not folded with the current flowing straight from one end to the other end of the electrode. This component of the inductance is thus given by $$L_1 = \frac{1}{8n^2} \frac{\mu_0 l d}{w}$$

where l and w are respectively the length and width of the electrode foil and d is the thickness of the dielectric materials. For a capacitor with approximate square layout with 7 folds and with 7 cells stacked in series and 2τ dielectric thickness, a low inductance of 0.42 nH is obtained.

On the other hand, the use of such side inserted electrode tabs has introduced a significant source of inductance due to movement of charges approximately transverse to the capacitor folding direction on entering or exiting the capacitor along the side inserted foil tabs as indicated by component B of FIG. 10.

For the case of a single pair of side inserted tabs, its inductance is assumed to be generated by current flow along a single pair of output electrode foils with $$L_1 = \frac{\mu_0 w d}{l_f}$$

where $l_f$ is the length of each folding of the foils. With comparable magnitudes of w and $l_f$, relatively low inductance is also obtained. For a capacitor with an approximately square layout and with 7 cells stacked in series and 2τ dielectric thickness, a relatively low inductance of 0.44 nH is obtained.

On the other hand, for a capacitor section with more than one pair of side tabs, there is a necessity to locate the tabs with opposite polarities on opposite sides of the winding. This is achieved by staggering the insertion of the two opposite polarity tabs into two successive foldings of the capacitor section. These opposite polarity tabs will then straddle across the midpoint of the folded capacitor section and will result in a large current loop cross section producing a significant contribution to the inductance of the capacitor unit.

It is readily shown that the corresponding inductance can be approximated by $$L_3 = \frac{\mu_0 w}{l_f} \frac{t}{2}$$

where t is the total finished thickness of the folded foils for the capacitor stack.

The inductance is proportional to the half thickness of the capacitor stack. For commercially available capacitors which are approximately 5" (12.7 cm) square in layout and with a thickness in the range of 3 to 4 cm, inductances in the range of 15 to 25 nH are calculated, similar to the range of values quoted by capacitor manufacturers.

As previously mentioned, the present invention provides an integral high-voltage capacitor circuit assembly that yields very low self inductance, and provides current and voltage multiplication. In the case of the first capacitor, the adjacent cells of the stack are connected in series by joining their foil electrodes on one longitudinal side of the foil electrodes. The connections may be made on only one longitudinal side of the foil electrodes, or optionally on both longitudinal sides. However, the latter alternative will yield no further advantage in performance. The same options apply, mutatis mutandis, to the other embodiments described herein. In the second capacitor, the adjacent cells of the stack are connected in series by joining their foil electrodes on both longitudinal sides of the foil electrodes.

Figure 6:
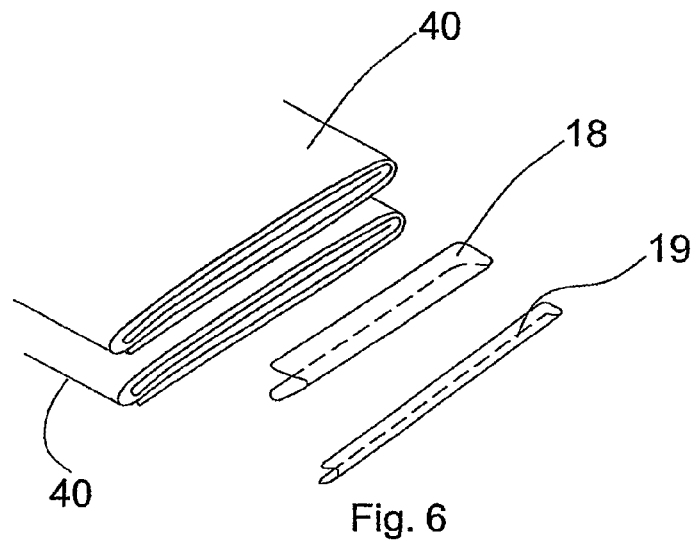
FIGS. 6, 7 and 8 are diagrammatic illustrations of inserting a bridging element that connects the foil electrodes of adjacent cells together according to an embodiment of the present invention.
Figure 7:
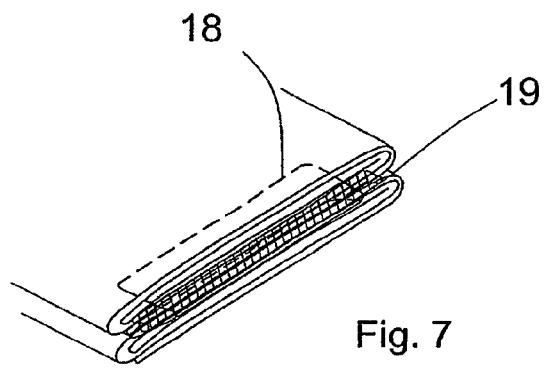
Figure 8:
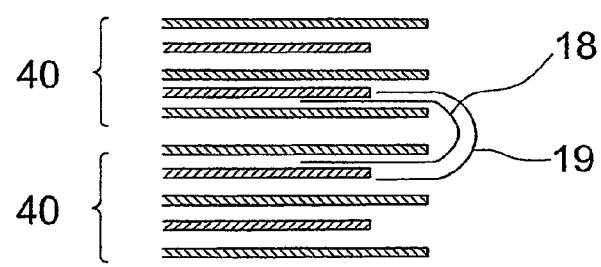

FIGS. 6, 7 and 8 are diagrammatic illustrations that show how the foil electrodes of adjacent cells are joined at a single instance by a bridging element on the or each longitudinal side of the foil electrodes. The bridging element (which may be considered as equivalent to a pair of side tabs used) connects the foil electrodes of adjacent cells together substantially at their longitudinal centers. The bridging element contacts each foil electrode over substantially the length of one folded section. As shown in FIG. 6, preferably, the bridging element is a sheet-like element 18 that is folded to define a pair of legs for connection to the respective foil electrodes of the adjacent cells. The sheet-like element 18 may be a metal foil connector. Other than inserting the metal foil connector, an outer protector 19, also folded to define a pair of legs acts as an insulator. The insulator will increase substantially the voltage holding performance of the capacitor but will not substantially increase its inductance.

Preferably, the length of the aluminum foils and Mylar®/paper assembly for each capacitor cell is in the range of 1 to 20 meters, resulting in low inductance and yet yield acceptable transit time delay broadening of the discharge current pulse.

Depending on the width and length of the folded portions, each folded section of the foil electrode (i.e. capacitor cell) may either be generally rectangular or square in shape. The first and second capacitors 11, 12, with each capacitor consisting of a stack of the folded capacitor cells, are connected in series. The first and second capacitors 11, 12 are disposed adjacent one another, with the folded sections of their foil electrodes mutually parallel. In a preferred embodiment, the first and second capacitors 11, 12 are stacked vertically, with one laid on top of the other. Such an arrangement facilitates their interconnection in a manner analogous to the interconnection of adjacent cells in each capacitor.

FIG. 9 shows a cross sectional layout of an embodiment of the capacitor assembly according to an embodiment of the present invention. The capacitor assembly is encapsulated in a casing body 70, and with terminal means for providing external electrical connection with the assembly through the casing body. Preferably, the first and second capacitors are interconnected by the bridging element 13b on said one longitudinal side. The bridging element 13b may be provided on only that one longitudinal side, or on both longitudinal sides of the capacitors. However, the latter alternative will yield no further advantage in performance. The same options apply, mutatis mutandis, to the other embodiments described herein.

In the case of the embodiment as shown in FIG. 9, the bridging element 13b interconnects the first and second capacitors 11, 12 on the left longitudinal side only. Preferably, these capacitors 11, 12 are encapsulated in a hard casing body 70. The tabs intended for connection to external circuit components are connected to bar electrodes 17 which are connected to external bar electrodes with O-ring seals on the inner side of the casing 70.

In this particular embodiment, a laser channel 60 and a triggered switch 50 are the external circuit components which are connected to the capacitor assembly. In the case of using a triggered switch, preferably the triggered switch is a rail gap switch of low inductance design and the discharge loop inductance across the switch is kept to a minimum.

A first pair of external electrodes is connected to the first and second capacitors 11, 12 in series, and a second pair of external electrodes is connected to the second capacitor.

The first pair of external electrodes is connected as close as possible to the left longitudinal side of the foil electrodes, and the second pair of external electrodes is connected as close as possible to the right longitudinal side of the foil electrodes. The discharge current loop inductance is thus kept to a minimum.

The bridging element 13b that adjoins the first and second capacitors 11, 12 is on the same side where the first pair of external electrodes is connected. This is to minimize the discharge loop cross section arising from current flowing in and out of the stack of capacitor sections.

The length of the external electrodes on the left longitudinal side suitably corresponds substantially to the length of the laser discharge channel 60, whereas the length of the external electrodes on the right longitudinal side suitably corresponds substantially to the length of the trigger gap switch 50.

Preferably, the dimensions of the basic capacitor section are optimized with the length of the adjoined first and second capacitors made substantially equal to the length of the external electrodes. With regard to using the laser channel 60 as an example, for a typical laser discharge electrode length of 18" (46 cm), 18" (46 cm) wide aluminum foil and 20" (51 cm) wide Mylar® and paper foils are used. The foils are folded at 20" (51 cm) intervals forming an approximate 20" (51 cm) square capacitor section. The inserted side bridging elements 13 are 18" (46 cm) wide and are just 1" (2.5 cm) shorter on both edges than the folded capacitor sections.

Now, we shall look at how the capacitor assembly according to the present invention is used in the LC inversion and the capacitor transfer discharge circuit configurations, where the capacitor assembly is intended for connection to the laser channel 60 and the trigger gap switch 50.

Figures 11, 12:
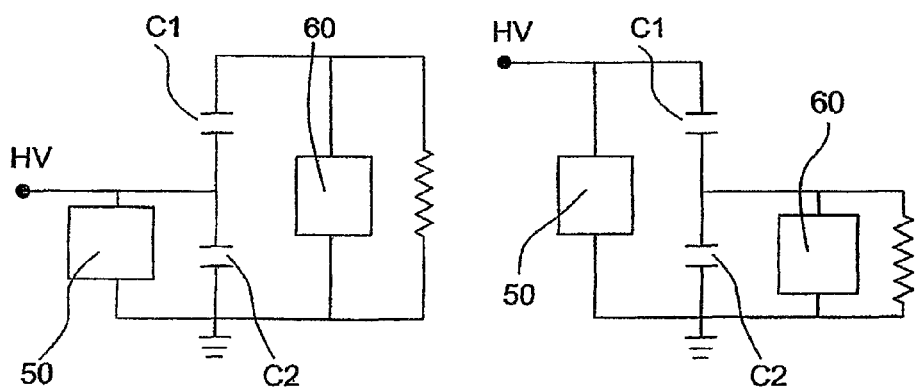
FIG. 11 is a circuit configuration of an LC inversion discharge circuit according to an embodiment of the present invention.
FIG. 12 is a circuit configuration of a capacitor transfer circuit according to an embodiment of the present invention.

In the LC inversion configuration (FIG. 11, also shown construction-wise in FIG. 9), $C_1$ and $C_2$ are chosen to be approximately equal.

All the capacitor sections are adjoined by the bridging elements 13 on the same side as the laser channel 60. This will ensure minimum circuit loop cross section arising from current flowing in and out of the stack of capacitor sections. This will also ensure induced magnetic flux linkage exists only between the pairs of capacitor foil electrodes as well as the small loop cross section resulting from the connections between the capacitor sections and the laser channel 60. Thus, the bridging elements 13 adjoin capacitor cells in $C_1$ and $C_2$ (13a), as well as between capacitors $C_1$ and $C_2$ (13b), on the same side as the laser channel. In order to obtain a fast current discharge through the trigger gap switch, the bridging elements 13a also join the capacitor cells in $C_2$ on the side of the trigger gap switch. Therefore, in the case of the LC inversion configuration, the adjoining bridging elements 13a of the capacitor cells in the second capacitor $C_2$ are on both sides to obtain fast discharge both across the trigger gap switch as well as the laser channel.

In the capacitor transfer circuit configuration (FIG. 12), the positions of the laser channel 60 and the trigger gap switch 50 are interchanged, and $C_1$ is chosen to be 3 to 4 times larger than $C_2$.

The adjoining bridging elements 13a of the capacitor cells in the second capacitor $C_2$ are also provided on both sides so as to obtain fast discharge both across the trigger gap 50 as well as the laser channel 60. On the other hand, the capacitor cells in $C_1$ need only be adjoined on the side where the trigger gap switch 50 is connected to, to achieve fast charge transfer operation.

For the LC inversion circuit, using the same laser channel dimension mentioned earlier with electrode length of 46 cm, two approximately square and equal capacitors with 7 folds and a Mylar®/paper dielectric are employed. Using 7 stacks of basic capacitor cells in order to attain 50 kV rating, an approximate capacitance of 190 nF and a self inductance of less than 1 nH for each of the two capacitors are obtained. A nominal value of 1 nH is henceforth assumed to be the self inductance for each capacitor and is to be contrasted with the tens to hundreds of nanohenries of inductance associated with commercially available capacitors.

The laser channel cross section is designed to be as compact as possible and is connected as close as possible across the two appropriate edges of the capacitors in order to keep the discharge loop inductance to a minimum. Assuming a discharge loop cross section of 4×5 cm², a discharge loop inductance of 5.5 nH is obtained.

Operating at 50 kV charging, a voltage swing of up to 90 kV can be expected from the two capacitors in series across a total circuit inductance of 7.5 nH. A peak discharge current of 320 kA is obtained with a high peak discharge current of 7 kA/cm.

In the operation of the above system, it is assumed that the laser channel only breaks down when the voltage has swung fully to a maximum or the charges have been fully transferred to the second loop. This depends critically on the condition of the laser electrodes as well as the operating gas pressure. The use of a fast switching device such as a rail gap switch will also be critical in ensuring a faster voltage swing and rapid charge transfer process. When these conditions are not optimized, the laser channel fires prematurely and the peak discharge current will be substantially reduced.

The above preferred embodiment constitutes a configuration with the lowest circuit inductance possible. Someone skilled in the art may be able to assemble two separate units of conventional folded foil capacitors to construct the corresponding discharge circuits. However, the person will find that using commercially available folded foil capacitors with two electrodes, either of the single ended or of the double ended types, substantially higher circuit inductance will be generated.

One can also conduct similar analysis for the case of the capacitor transfer circuit with capacitors $C_1'$ and $C_2'$. Consider the case that $C_1'$ is twice the value of $C_1$ employed in the case of the LC inversion circuit and $C_2'$ is two times smaller than $C_2$ of the LC inversion circuit. By charging the capacitor transfer circuit to the same voltage as in the case of the LC inversion circuit, a high voltage pulse will develop across $C_2'$ leading to a high peak discharge current. This peak discharge current is generally somewhat slightly smaller than those of the LC inversion circuit with the same input charge energy.

Figure 13:
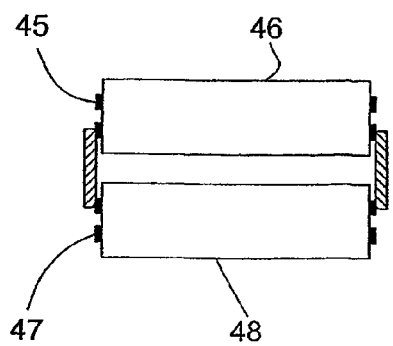
FIG. 13 is a diagrammatic illustration showing a double capacitor using two units of the capacitor assembly.

In order to increase the discharge current further, embodiments of the double LC inversion and double capacitor transfer discharge configurations are specified (FIG. 13). An embodiment of this invention is the use of two units of the capacitor assembly stacked back to back one on top of the other. By connecting the bottom external electrode 45 of the upper stack 46 to the top external electrode 47 of the lower stack 48, three external electrodes are now constituted.

Figure 14:
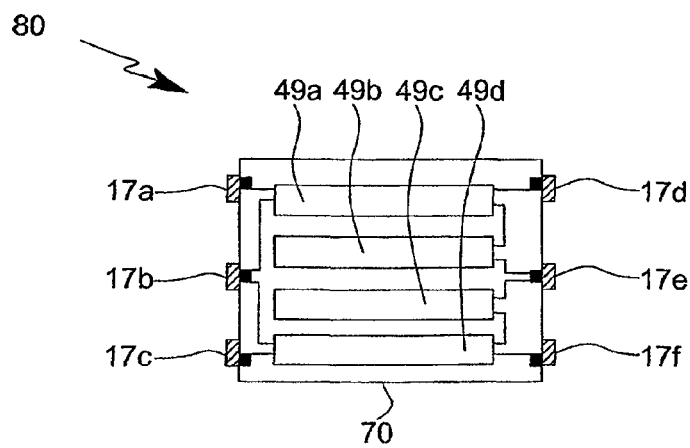
FIG. 14 is a diagrammatic illustration showing a quad capacitor assembly using four capacitors, according to an embodiment of the present invention.
Figure 15:
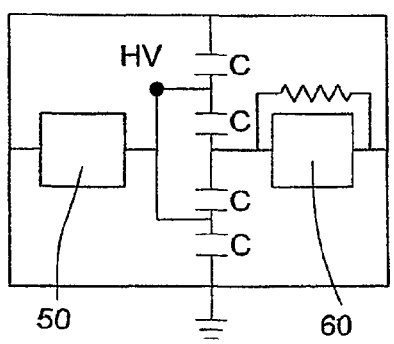
FIG. 15 is a schematic diagram of a double LC inversion discharge circuit using four capacitors of the capacitor assembly.
Figure 16:
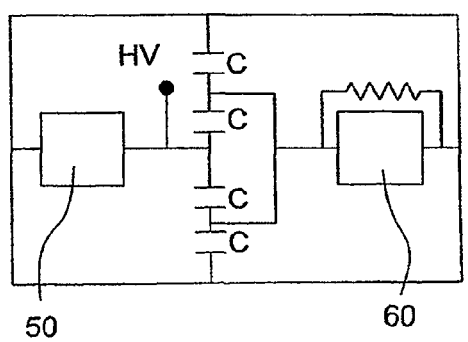
FIG. 16 is a schematic diagram of a double capacitor transfer circuit using four capacitors of the capacitor assembly.

However, a preferred embodiment of the present invention is the integration of the four capacitors 49a to 49d into a single casing as shown in FIG. 14. The quad capacitor assembly 80 has three external electrodes on both sides for connection to the laser channel and the rail gap accordingly as shown schematically in FIG. 15 for the double LC inversion circuit and FIG. 16 for the double capacitor transfer circuit. For the three-electrode quad capacitor assembly, the outer two electrodes are common and convenient methods of connecting to the laser channel and the trigger gap are shown in FIGS. 15 and 16.

Effectively, the double LC inversion operates with the voltage scaled by a factor of approximately two due to voltage inversion for two of the capacitors. With two parallel sets of two capacitors in series each, the capacitance and self inductance remains approximately the same as those of a single capacitor, the maximum discharge current is thus approximately increased to 488 kA or at 10.6 kA/cm of discharged.

Similar analyses can be carried out for the double capacitor transfer circuit. The resultant voltage is approximately twice that of the corresponding capacitor transfer circuit, the value of which is determined by the ratio of the storage to the peaking capacitors. Generally, slightly lower peak discharge current is obtained.

In another embodiment, instead of doubling the discharge current, the 2-stage LC inversion or 2-stage capacitor transfer circuits deliver almost two times the delivered voltage of the LC inversion or the capacitor transfer circuits respectively.

Figure 17:
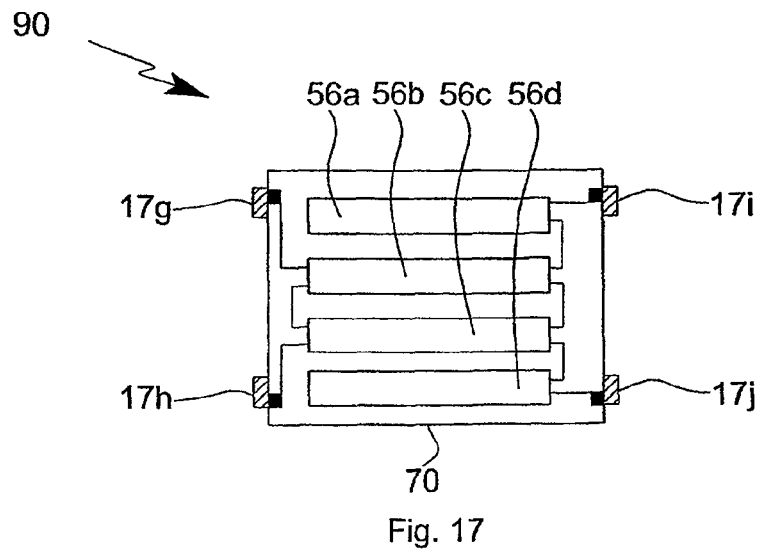
FIG. 17 is a diagrammatic illustration showing a quad capacitor assembly using four capacitors, according to an embodiment of the present invention.

A preferred embodiment is the integration of the four capacitors 56a to 56d into a single casing as shown in FIG. 17.

Figure 18:
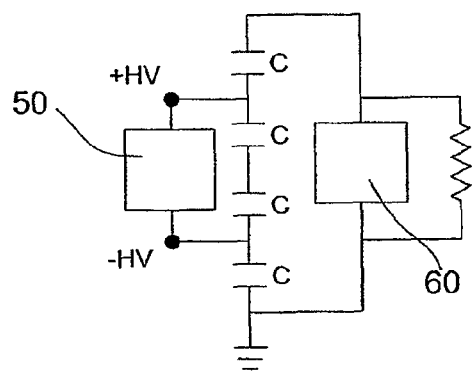
FIG. 18 is a schematic diagram of a 2-stage LC inversion discharge circuit using four capacitors.
Figure 19:
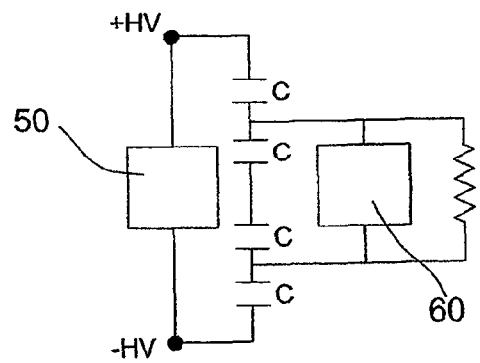
FIG. 19 is a schematic diagram of a 2-stage capacitor transfer circuit using four capacitors.

The quad capacitor assembly 90 has two electrodes on both sides for connection to the laser channel and the trigger gap accordingly as shown schematically in FIG. 18 for the 2-stage LC inversion and FIG. 19 for the 2-stage capacitor transfer circuit.

By charging the two units of twin capacitor to +V and −V respectively, the resulting voltage in the case of the 2-stage LC inversion circuit is approximately four times that of the single capacitor discharge. The voltage will be scaled by four times, the capacitance reduced by a factor of four and the self inductance of the capacitor increased by a factor of four. At 180 kV and 47.8 nF and 9.5 nH, the peak discharge current can deliver a peak current as high as 406 kA. The peak discharge current is lower than that of the double LC inversion circuit. However, the resultant discharge voltage is four times that of the charging voltage.

Similar analyses can be carried out for the 2-stage capacitor transfer circuit. The resultant voltage is approximately twice that of the corresponding capacitor transfer circuit, the value of which is determined by the ratio of the storage to the peaking capacitors.

Figure 20:
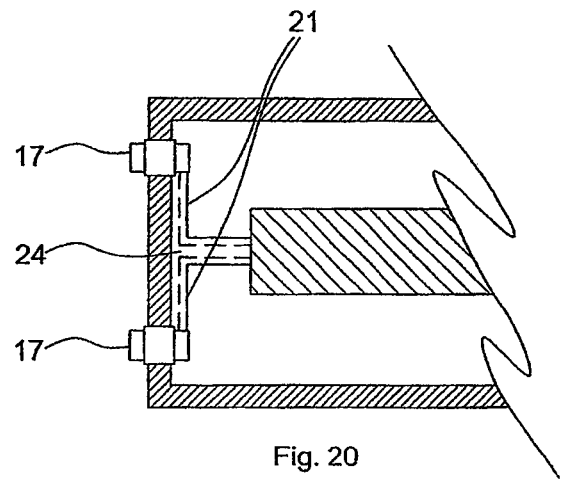
FIGS. 20 to 22 show embodiments of a 4-electrode capacitor assembly and in particular details of terminal connections to external electrodes.
Figure 21:
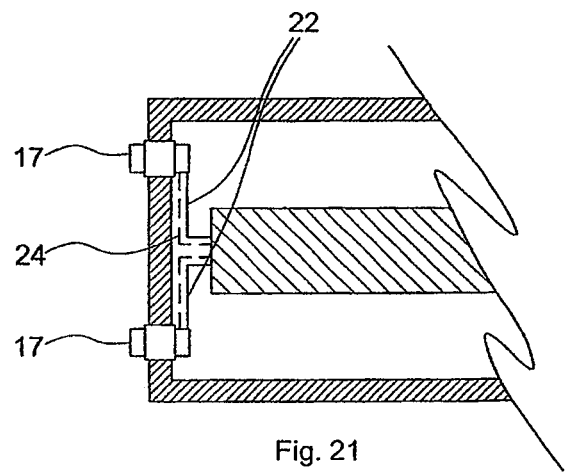
Figure 22:
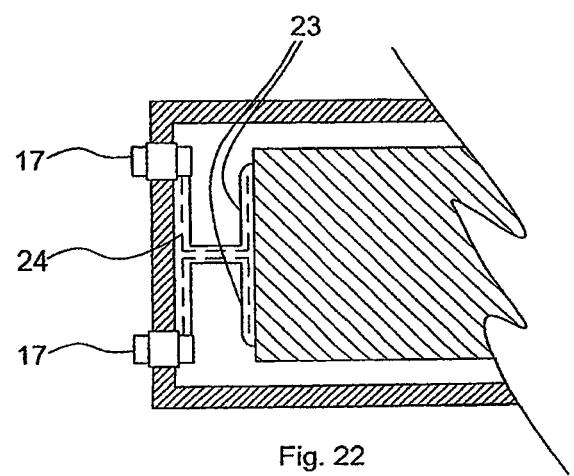

In the case of four-electrode capacitor assembly, such as those shown in FIG. 9 or FIG. 17, wherein the two pairs of external electrodes are on opposing longitudinal sides of the assembly, further refinements can be made to reduce the discharge and switch loop inductance. This can be achieved by bending longitudinally a pair of sheet-like conductive elements 21 that connect the external electrode bars 17 with the capacitor assembly into two inverted L-shapes as in the cross-sectional view in FIG. 20. If the casing wall is sufficiently close enough to the capacitor assembly, then the pair of insulated sheet-like conductive elements 22 will be bent longitudinally in opposite directions upon exiting the foil electrodes of the capacitor assembly and then connected to the external electrode bars 17 as in FIG. 21. If the pair of conductive sheet-like elements 23 exit from the capacitor assembly with a relative large gap, due to the assembly being constituted from cells that are thick or numerous, the elements are bent longitudinally into two inverted U-shapes as in FIG. 22. Insulator film 24 will be inserted and bent similarly to protect the two elements 21, 22, 23 from shorting inside the casing.

Figure 23:
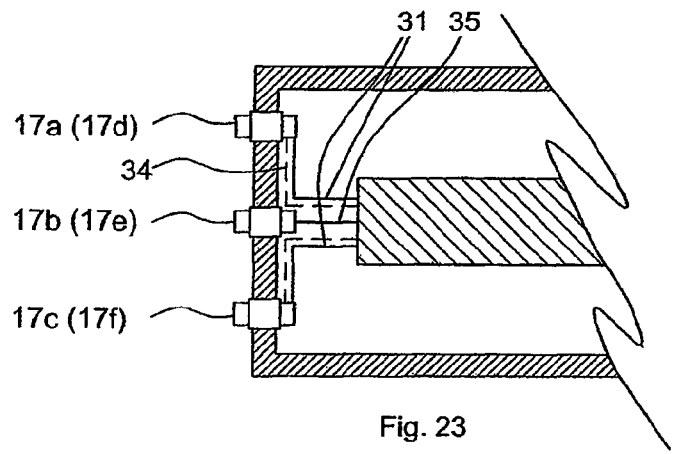
FIGS. 23 to 25 show embodiments of a 6-electrode capacitor assembly and in particular details of terminal connections to external electrodes.
Figure 24:
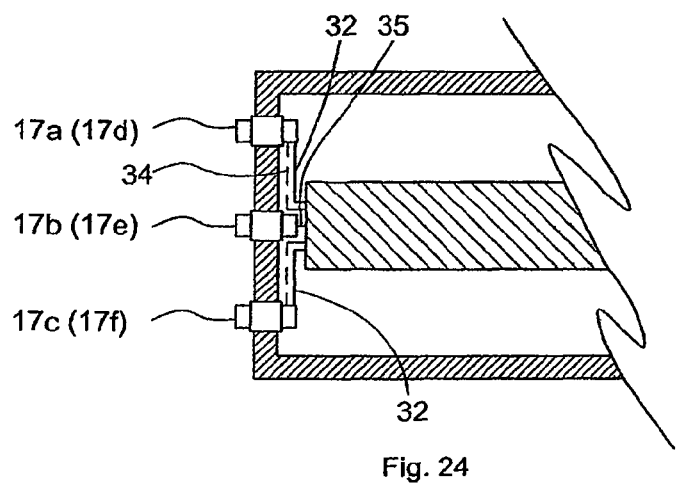
Figure 25:
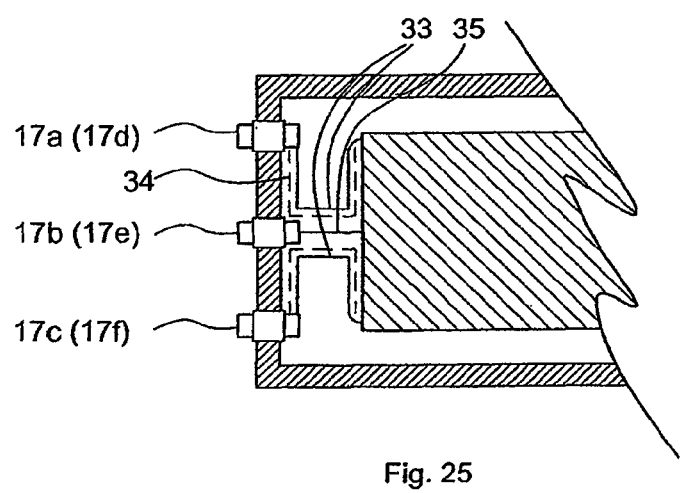

Similarly refinements can be made in the case of the six-electrode capacitor assembly, such as that shown in FIG. 14, wherein two three-electrode sets, 17a, 17b, 17c and 17d, 17e, 17f, are on opposing longitudinal sides of the assembly. This can be achieved by bending longitudinally the top and bottom sheet-like conductive elements 31 that connect to the outer electrode bars 17a, 17c, 17d, 17f into two inverted L-shapes, as in the cross-sectional view of FIG. 23. If the casing wall is sufficiently close enough to the capacitor assembly, then the insulated sheet-like conductive elements 32 will be bent longitudinally in opposite directions upon exiting the foil electrodes of the capacitor assembly and then connected to the external electrode bars as in FIG. 24. If the top and bottom conductive elements 33 exit from the capacitor assembly with a relatively large gap, due to the assembly being constituted from cells that are thick or numerous, the elements are bent longitudinally into two inverted U-shapes as in FIG. 25. In all examples of FIGS. 23, 24, and 25, the middle element 35 will make a direct connection with the middle electrode bar 17b, 17e. Insulator film 34 will be inserted and bent similarly to protect the elements 31, 32, 33 from shorting inside the casing.

If either the L-shaped or U-shaped element folding is used in the above mentioned assemblies, the distance traveled by the current may be increased, but circuit inductance will be reduced due to a smaller circuit loop.

Care must be taken to ensure that the spacing between the outer electrode bars in FIGS. 20 to 25 provide for enough insulation so that discharge or switching occurs within their respective devices and not along the external casing wall.

The invention may be embodied in numerous ways other than as described herein without departure from its scope, as defined by the following claims. By way of example only, the dielectric materials used in the capacitor assembly of the invention, may be replaced by new technology equivalents such as plastic resin films including hazy polypropylene films.

The invention claimed is:

1. A high-voltage capacitor assembly, comprising:
a first capacitor (11); and
a second capacitor (12);
each capacitor comprising a stack of capacitor cells (40) connected in series;
each of the capacitor cells (40) comprising an arrangement of a pair of elongate foil electrodes (10) separated by dielectric (20, 30) and multiply-folded in a substantially flat, wound configuration;
wherein adjacent cells of the stack comprising the first capacitor are connected in series by joining their foil electrodes on one longitudinal side of the foil electrodes;
wherein adjacent cells of the stack comprising the second capacitor are connected in series by joining their foil electrodes on both longitudinal sides of the foil electrodes; and
wherein the first and second capacitors are connected in series and integrated into an enclosure (70);
wherein the assembly includes external electrodes (17) that are connected internally to the first and second capacitors (11, 12);
wherein the external electrodes comprise on said one longitudinal side a first pair of external electrodes connected to the first and second capacitors in series, and on the other longitudinal side a second pair of external electrodes connected to the second capacitor; and
wherein the pairs of external electrodes are connected to the respective capacitor foil electrodes via partially insulated sheet-like conductive elements that are bent longitudinally to form two inverted L-shapes (21, 22) or two U-shapes (23).

2. A high-voltage capacitor assembly according to claim 1, wherein the external electrodes (17) have a length substantially corresponding to the length of the folded sections of the foil electrodes.

3. A high-voltage capacitor assembly according to claim 1, wherein the first pair of external electrodes (17) are disposed on one side of the assembly in proximity to said one longitudinal side of the foil electrodes, and the second pair of external electrodes (17) are disposed on the other side of the assembly in proximity to the other longitudinal side of the foil electrodes.

4. A high-voltage capacitor assembly according to claim 1, wherein the foil electrodes (10) of adjacent cells are joined at a single instance on the one or both longitudinal sides of the foil electrodes.

5. A high-voltage capacitor assembly according to claim 1, wherein said foil electrodes of adjacent cells are connected together by a bridging element (13) that contacts each foil electrode over substantially the length of one folded section.

6. A high-voltage capacitor assembly (80; 90), comprising:
a first capacitor (49b; 56a);
a second capacitor (49a; 56b);

a third capacitor (49d; 56c); and
a fourth capacitor (49c; 56d);
  each capacitor comprising a stack of capacitor cells (40) connected in series;
  each of the capacitor cells (40) comprising an arrangement of a pair of elongate foil electrodes (10) separated by dielectric (20, 30) and multiply-folded in a substantially flat, wound configuration;
  wherein adjacent cells of the stacks comprising the first and fourth capacitors (49b, 49c; 56a, 56d) are connected in series by joining their foil electrodes on one longitudinal side of the foil electrodes;
  wherein adjacent cells of the stacks comprising the second and third capacitors (49a, 49d; 56b, 56c) are connected in series by joining their foil electrodes on both longitudinal sides of the foil electrodes; and
  wherein the first, second, third and fourth capacitors are connected in series and integrated into an enclosure (70);
  wherein the assembly includes external electrodes that are connected internally to the first, second, third and fourth capacitors (49a to 49d, 56a to 56d); and
  wherein the external electrodes extend in parallel on one side of the assembly, an outer pair of the external electrodes being connected to the respective capacitor foil electrodes via partially insulated sheet-like conductive elements that are bent longitudinally to form two inverted L-shapes (31, 32) or two U-shapes (33).

7. A high-voltage capacitor assembly according to claim 6, wherein said external electrodes comprise three external electrodes that extend in parallel on one side of the assembly.

8. A high-voltage capacitor assembly according to claim 6, wherein on one side of the assembly corresponding to said one longitudinal side, the external electrodes comprise a first external electrode (17a) connected to the second capacitor (49a), a second external electrode (17b) connected to the second and third capacitors (49a, 49d) and a third external electrode (17c) connected to the third capacitor (49d).

9. A high-voltage capacitor assembly according to claim 8, wherein on the other side of the assembly corresponding to the other longitudinal side, the external electrodes comprise another first external electrode (17d) connected to the second capacitor (49a), another second external electrode (17e) connected to the first and fourth capacitors (49b, 49c) and another third external electrode (17f) connected to the third capacitor (49d).

10. A high-voltage capacitor assembly according to claim 6, wherein on one side of the assembly corresponding to said one longitudinal side, the external electrodes comprise a first pair of external electrodes (17i, 17j) connected to the first and fourth capacitors (56a, 56d).

11. A high-voltage capacitor assembly according to claim 10, wherein on the other side of the assembly corresponding to the other longitudinal side, the external electrodes comprise a second pair of external electrodes (17g, 17h) connected to the second and third capacitors (56b, 56c).

12. A high-voltage capacitor assembly according to claim 6, wherein the foil electrodes (10) of adjacent cells are joined at a single instance on the one or both longitudinal sides of the foil electrodes.

13. A high-voltage capacitor assembly according to claim 12, wherein said foil electrodes (10) of adjacent cells are connected together substantially at their longitudinal centers.

14. A high-voltage capacitor assembly according to claim 6, wherein said foil electrodes of adjacent cells are connected together by a bridging element (13) that contacts each foil electrode over substantially the length of one folded section.

15. A high-voltage capacitor assembly according to claim 14, wherein the bridging element (13) is a sheet-like element (18) that is folded to define a pair of legs for connection to the respective foil electrodes of the adjacent cells.

16. A high-voltage capacitor assembly according to claims 6, wherein said capacitors are interconnected on said one longitudinal side.

17. A high-voltage capacitor assembly according to claim 6, wherein each folded section of the foil electrode is generally rectangular or generally square in shape.

18. A high-voltage capacitor assembly according to claim 6, wherein each pair of elongate electrodes has a foil width of 0.2 to 1 meter and foil length of between 1 to 10 meters.

19. A high-voltage capacitor assembly according to claim 6, wherein said capacitors are disposed adjacent one another, with the folded sections of their foil electrodes mutually parallel.

20. A high-voltage capacitor assembly according to claim 6, wherein the assembly is impregnated with dielectric fluid.

21. A high-voltage capacitor assembly according to claim 6, wherein said enclosure (70) comprises encapsulation.

* * * * *